United States Patent
Bahar

(10) Patent No.: US 6,694,355 B1
(45) Date of Patent: Feb. 17, 2004

(54) METHOD AND SYSTEM FOR COLLECTIVELY GENERATING USER-CREATED DESIGNS OF PRODUCTS AND PROPERTY VIA A COMMUNICATIONS NETWORK

(76) Inventor: Reuben Bahar, 23708 Welby Way, West Hills, CA (US) 91307

( * ) Notice: Subject to any disclaimer, the term of this patent is extended or adjusted under 35 U.S.C. 154(b) by 0 days.

(21) Appl. No.: 09/524,940

(22) Filed: Mar. 14, 2000

(51) Int. Cl.[7] .............................................. G06F 15/16
(52) U.S. Cl. ........................ 709/217; 709/226; 345/783
(58) Field of Search .......................... 709/217; 345/733, 345/783, 329, 346, 2, 330

(56) References Cited

U.S. PATENT DOCUMENTS

| | | | | |
|---|---|---|---|---|
| 4,862,155 A | * | 8/1989 | Dalrymple et al. | 345/581 |
| 4,970,644 A | * | 11/1990 | Berneking et al. | 702/6 |
| 5,121,131 A | * | 6/1992 | Bouldin et al. | 347/95 |
| 5,388,264 A | * | 2/1995 | Tobias et al. | 707/103 R |
| 5,392,400 A | * | 2/1995 | Berkowitz et al. | 709/203 |
| 5,649,024 A | * | 7/1997 | Goldsmith | 382/170 |
| 5,706,455 A | * | 1/1998 | Benton et al. | 345/853 |
| 5,734,761 A | * | 3/1998 | Bagley | 382/309 |
| 5,991,796 A | * | 11/1999 | Anupam et al. | 709/206 |
| 5,999,190 A | * | 12/1999 | Sheasby et al. | 345/589 |
| 6,031,529 A | * | 2/2000 | Migos et al. | 345/783 |
| 6,151,020 A | * | 11/2000 | Palmer et al. | 345/733 |
| 6,321,236 B1 | * | 11/2001 | Zollinger et al. | 707/203 |

* cited by examiner

Primary Examiner—David Wiley
Assistant Examiner—Thanh T. Nguyen
(74) Attorney, Agent, or Firm—Cahill, von Hellens & Glazer P.L.C.

(57) ABSTRACT

A method and system for mass-generating new or modified designs of products and other items over a communications network, such as the Internet. Users in the public may remotely access and run a computer design program on a remote host system where they may select and manipulate product parts for designated products, in order to create a new design for planned or existing products. Additionally, an award incentive is preferably provided to winning designs. In this manner, the remote host computer system may collect a multitude of design submissions from a great number of users.

20 Claims, 2 Drawing Sheets

Method 100

METHOD AND SYSTEM FOR COLLECTIVELY GENERATING USER-CREATED DESIGNS OF PRODUCTS AND PROPERTY VIA A COMMUNICATIONS NETWORK

BACKGROUND OF THE INVENTION

The field of the invention generally relates to methods of generating graphic designs. The invention relates more particularly to a computer method of mass-generating and acquiring design submissions of various products, merchandise, and other items from the general public by means of a communications network, such as the Internet. Moreover, the method may incorporate an award incentive to promote greater participation in the creation and submission of graphic designs.

It has long been understood that one of the foundational premises of successful product merchandising and sales is the aesthetic and outward appearance of a product. While necessity and utility may effect the decision to purchase, it is a particular fashion, style, or appearance that so often determines consumer preference of one product brand over another, and ultimately the consumer's purchase selection. For this reason, many producers of commercial products and goods consider aesthetic product design as a vital component to their long-term marketing and sales strategies, as well as their ability to compete effectively.

Unfortunately, given the continuous evolution of tastes, trends, and styles, manufacturers find themselves investing heavily in market research and professional design consultants, in order to determine the popular "new look" for upcoming products. These traditional methods, wherein public opinion is sampled and professional designers are hired, can be unduly costly without necessarily achieving an accurate reflection of popular taste, style, or opinion. This is due in part to the inherently limited number of designs that can realistically be generated by an individual design consultant, or a products design group. Furthermore, market polling and testing only samples a relatively small number of individuals, and is at best an indirect approximation of the popular view of an existing product.

Today, with the advent and growing prominence of the Internet as a communications and commercial medium, producers and suppliers are now better able to ascertain the popularity of their products and product designs, by receiving comments and feedback directly from users/consumers via electronic mail, i.e. "e-mail." However, much of the consumer opinion and feedback transmitted over the Internet has traditionally been limited to textual comments, rather than user-designed graphic images detailing potential improvements and suggestions. This has been due to the substantially burdensome barriers associated with submitting original user-created graphic designs, particularly when no incentives for such submissions are provided. In order to submit a new design, a graphic design software must first be purchased or otherwise obtained. After this is achieved, both time and energy must be spent in creating/editing a design using the software. Without access to a readily available graphic design environment and the proper incentive, these measures are generally not worth the user's time and effort in order for him/her to merely suggest and submit a new design.

Thus, there is clearly a need for a method which provides an easily accessible means for users/consumers to create and submit new designs for various existing products. In particular, by utilizing the pervasiveness of the Internet, the collective creativity of users in the general public may be harnessed to provide large-scale generation and collection of product designs. The advantage to manufacturers and producers would be the accumulation of a wealth of design ideas, many of which would not have been conceived of independently. In this manner, producers would be able to utilize the collected images to better ascertain consumer trends and styles of the times, and to produce a product accordingly so as to maximize sales.

BRIEF SUMMARY OF THE INVENTION

It is an object of the present invention to provide a method of mass-generating user-created designs of products and other items designated for design over a communications network, whereby a product manufacturer may acquire a multitude of new design suggestions from the general public.

It is a further object of the present invention to provide a method of mass-generating user-created designs utilizing a graphic design program having online graphic design tools and an online parts catalog, and capable of opening multiple concurrent sessions.

It is a still further object of the present invention to provide a method of mass-generating user-created designs, wherein interest in creating and submitting new designs of a product is promoted by providing an award incentive.

It is a still further object of the present invention to provide a networked computer system capable of providing online design tools and an online parts catalog on a remote host system which may be remotely accessed and operated by a plurality of users from client systems, for mass-generating the user-created designs.

The present invention is for a method and system for collectively generating for acquisition user-created designs of products over a communications network. The method and system establishes graphic design software on a remote host system which is connected to the communications network. The graphic design software is configured to run multiple, concurrent, and independent program sessions on the remote host system, and has a database module and a graphic tool module. The database module contains product data for at least one product, with the product data preferably including a plurality of parts images for at least one product. The graphic tool module may be used to visually affect graphic images, including the parts images. The graphic design software is then made publicly accessible by remote interface means, wherein a plurality of users may each run a program session of the graphic design software on the remote host system from client systems connected to the communications network. Next, in response to each of the plurality of users, an independent program session of the graphic design software is run on the remote host system. This includes, under control of each of the plurality of users, selecting at least one target product to be designed, preferably selecting at least one parts image associated with the selected target product(s), creating a final design of the selected target product(s) using the graphic tool module, and submitting the final design to the remote host system. And finally, the final design is storably received on data storage means of the remote host system. In this manner, the remote host computer system may collect a multitude of design submissions from a great number of users.

DETAILED DESCRIPTION OF THE PREFERRED EMBODIMENTS

Figure 3:
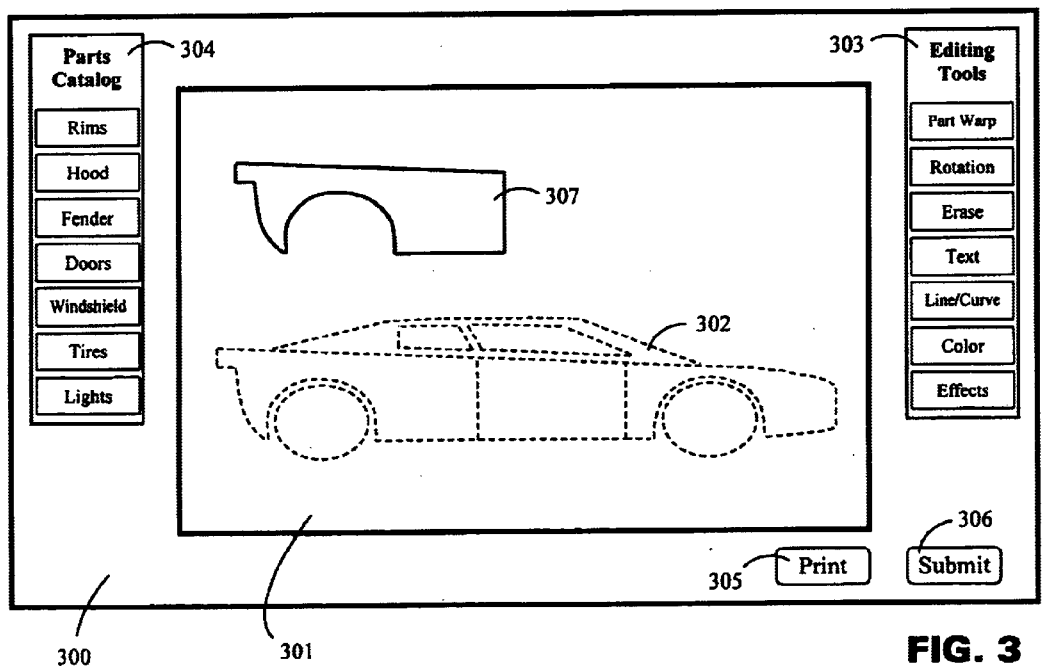
FIG. 3 is a screen view of the graphic design software as seen from a client system, illustrating the parts catalog and editing tools available for designing a product, e.g. an automobile.

Referring now to the drawings, FIGS. 1–3 together show a method and system (hereinafter "method"), generally indicated at reference character 100 in FIG. 1, for collectively generating user-created designs of products and property via a communications network, such as the Internet.

As noted in the background discussion, product design is a key factor which can determine the commercial success or failure of a product. To this effect, the method 100 functions to increase the number of potential product designs from which a manufacturer/producer of a product may select for a future product, or for modifying and updating an existing product. While the invention itself does not "generate" or produce new product designs per se, the method 100 provides the online environment and the design tools with which consumers and users may individually create product designs. In this manner, producers are able to "generate," in a collective sense, a multitude of designs which would otherwise have been difficult, if not impossible, to obtain. Furthermore the collection of user-created designs may more accurately reflect the popular opinion, style, and/or trend relating to product designs, to thereby enable manufacturers to produce a more appealing, and commercially viable product.

It is notable that the term "product," is defined and understood herein and in the claims to mean any item or class of items, preferably of manufactured origin, which is commercially or otherwise made available to the general public. Preferably, the product is an existing item already in production, and popular or otherwise publicly known. In this regard, product recognition would allow users to better ascertain any areas for aesthetic design improvement. However, the product may also be a non-existing item that is planned for production. Typical examples of contemplated target products include, but are not limited to, vehicles, electronics, appliances, furniture, clothes, toys, sports products, etc. Furthermore "product" is broadly defined to also include real estate and intellectual properties suitable for designing, including, but not limited to building architecture and adornment, and trademarks.

It is also notable that although the following discussion will be primarily in the context of the Internet (113 in FIG. 1) and the World Wide Web, the term "communications network" as used herein and in the claims, is intended to include all forms of network environments known to one in the relevant technical art. Thus the method 100 is equally applicable to all interconnected computer systems capable of transmitting and receiving data, including, but not limited to, all telecommunications networks such as the Internet 113, i.e. the World Wide Web, gopher, and BBS systems, hardwire telephony, wireless networks including cellular and PCS systems, satellite networks, etc. Furthermore, communications networks include localized and regional networks such as intranets and local area network (LAN) systems which interconnect a relatively few number of user systems or terminals, typically by means of a centralized server.

Figure 1:
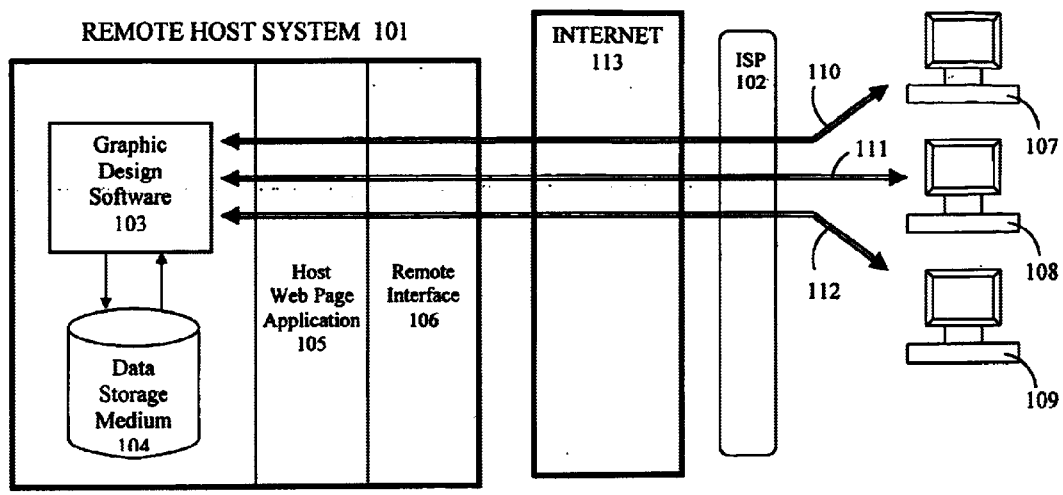
FIG. 1 is an overview flowchart pictorially depicting the general flow of information between a remote host system and multiple client systems via the Internet.

FIG. 1 shows the flow of user access and information that occurs in the method 100. In particular, the method 100 enables a host service provider operating a remote host system, generally indicated at reference character 101, to provide a graphic design software 103 to users in the general public, represented by three representative users indicated at reference characters 107–109 in FIG. 1. The software 103 is typically installed on data storage means 104, such as a hard drive disk or other data storage medium, and is processed and executed by data processing means, i.e. a central processing unit (CPU) (not shown). Furthermore, the software 103 is network configured to run multiple, concurrent, and independent program sessions on the remote host system 101 using a single software package, in a manner known in the relevant art. Thus, multiple users may concurrently and independently access and operate the program, as indicated by arrows 110, 111, and 112, as will be discussed further below.

The graphic design software 103 preferably has two application modules, including a database module containing product data for at least one product. Preferably the product data includes various parts images associated with a particular product, which serves to preserve a product's distinct features. For example, a particular type of automobile will have stored in the database module, parts images specific to the particular automobile, such as original fenders, doors, wheels, seating, etc., as well as steering wheels, and interior dashboard configurations. The database module also includes other product data, such as specifications, finally-assembled images, and other information particular to the product. Furthermore, the graphic design software 103 also includes a graphic tool module for creating, editing, and otherwise graphically manipulating and visually affecting graphic images, namely the parts images associated with the particular product. The graphic tool module may include traditional editing features such as cropping, sizing, warping, color, etc., of existing graphic images, i.e. the parts images of a product. However, it is not limited only to such. The graphic tool module may also feature design tools which allow a user to create and utilize his/her own parts in developing a unique design, without resorting to the original specifications supplied by the available parts images.

As can be seen in FIG. 1, the graphic design software 103 can be concurrently and independently accessed by multiple users from client systems 107–109 by remote interface means 106 of the remote host system 101. As used herein and in the claims, the remote interface means 106 is a suitable networking hardware or software application known in the relevant art of computer networking which enables multiple users to remote access designated data located in a host system, from a client system. The term "access" as used herein and in the claims, is defined and understood to mean initializing and running a software application where it is presently installed. Thus, because the graphic design software 103 is preferably installed on the remote host system 101, remote accessing of the software by a user from a client system 107–109 involves running the program 103 on the remote host system 101, and only the screen output is transmitted to and displayed on the client system 107–109.

It is notable that the term "access," when discussed in reference to the Internet, has traditionally been limited in meaning to situations where a user is connected to the Internet via an Internet service provider (ISP) or when specified "web pages" are downloaded to a client system when a corresponding uniform resource locator (URL)

address is entered. However, "access" has not been popularly used to describe the initializing and operation of remotely located software. This limitation has been largely due to the relatively slow and inefficient data transfer rate of traditional modems connected by means of traditional telephone lines. However, as is known by those conversant in the technical field, "access" and operation of remotely located software programs can now be realized on a real time basis with the growing use of high-speed modems, cable, T1, and digital subscriber lines (DSL) as preferred data conduits. These types of preferred data conduits are now available through various ISP's 102 to allow virtually real time remote operation. Thus, FIG. 1 illustrates direct access to a graphics design software 103 by connecting to the Internet 113 provided by such an ISP 102. In this manner, operation of the software 103 would be displayed on a user's client system virtually instantaneously without significant or noticeable delay.

Figure 2:
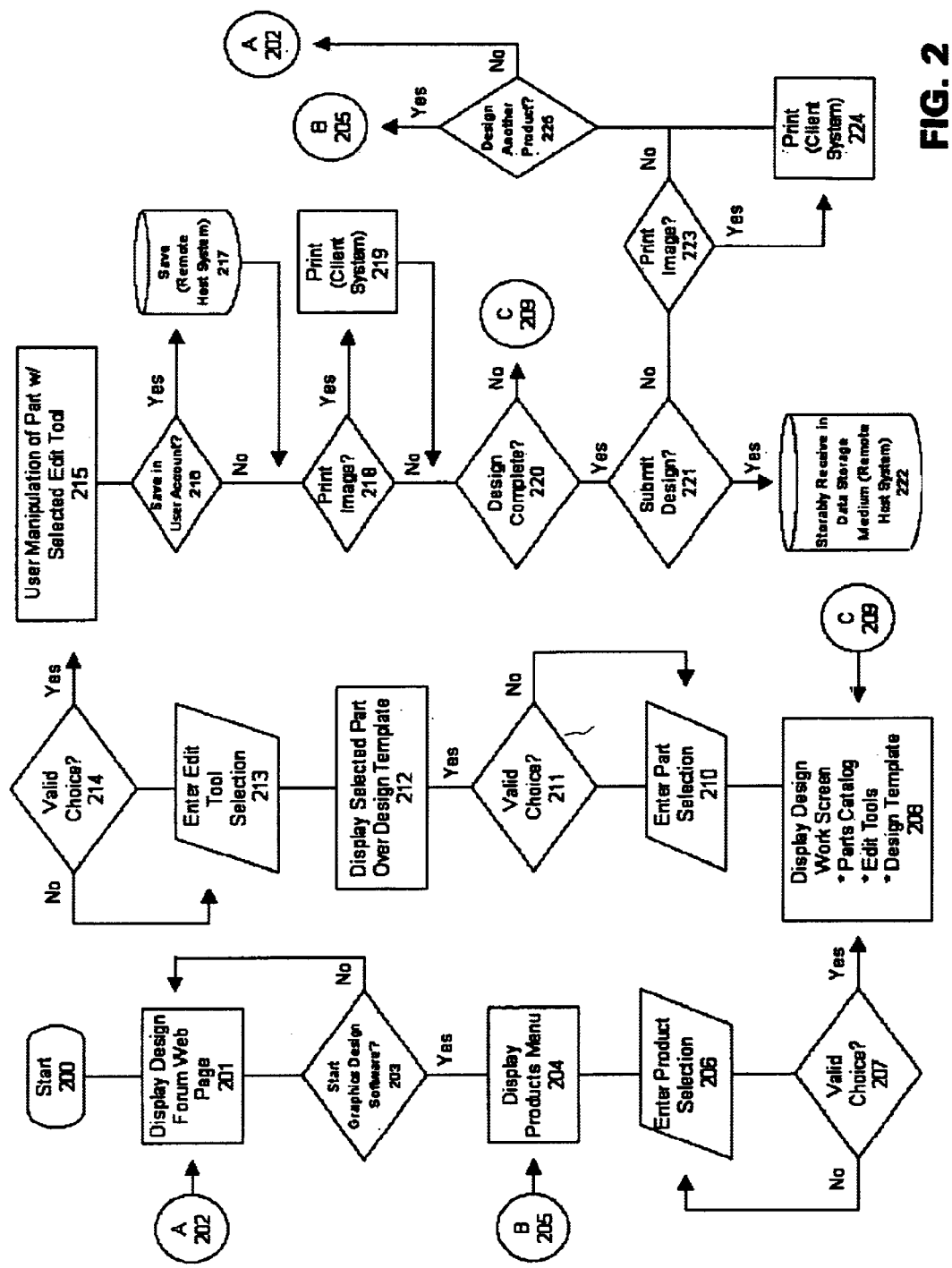
FIG. 2 is a block diagram of the information flow that occurs in the method and system for collectively generating user-created designs of products according to the present invention, upon accessing the remote host system.

FIG. 2 illustrates in block diagram form the real time operation of a preferred embodiment of the method 100 of the present invention. As can be seen in FIG. 2, a user starts at block 200 after accessing the remote host system 101 from a remote location. Preferably, although not shown in the figures, users would typically be required to register with the host service provider by opening a personal user account, prior to accessing the graphic design software 103, in order to establish a user's profile with the host system and to save a user's unfinished designs therein. As shown in FIG. 1, access to the graphic design software 103 is preferably predicated upon entering a host web page 105. Thus, from block 200 in FIG. 2, a host web page is displayed at block 201, which typically introduces the graphic design software and its operation, and provides an initializing link to the software. At block 203, the user decides whether to access the graphic design software.

If yes, the software is initialized and a products menu is displayed, as shown in block 204, listing the target products available for designing. At block 206, the user decides on a target product and enters the selection, upon which a determination is made whether the selection is a valid choice. If yes, a design workscreen (300 in FIG. 3) is displayed, as shown in FIG. 3, including a parts listing 304, and an editing tools menu 303. The design workscreen 300 also includes a graphics window 301 where an outline or silhouette 302 of the product is preferably displayed. The outline/silhouette functions to guide the user in maintaining the basic structure of the product, and is not intended to be limiting in any manner. At block 210, the user may next select a target parts image 307. Preferably, selection of a parts image can be accomplished from a menu, such as the parts listing 304 as shown in FIG. 3. In this embodiment, a selected parts image 307 is displayed on the outline 302 of the product for the first time. In an alternative embodiment, all parts images associated with a particular product may be pre-displayed, whereby the user may then directly select a parts image, e.g. by pointing and clicking a mouse. In any case the validity of the choice is determined at block 211. If the selection is not valid, another selection must be made. If valid, the part selection 307 will be subject to subsequent manipulation. At block 213, the user selects means for visually affecting a graphic image, i.e. an edit tool. It is notable that once the design workscreen is entered, the order in which edit tools and target parts images are selected, blocks 210 and 213, may be reversed. In any case, following block 213, the remote host system determines if the choice was valid at block 214. If yes, the edit tool is selected and the user manipulates the selected parts with the selected edit tool at block 215. At this point, the user is given the option to save his unfinished design in his user account at block 216. If yes, the design is saved to the data storage means at block 217. Alternatively, the user may opt to save the unfinished design on his own local data storage means. Next, the user may print the design on a local printer, as indicated at block 218 in FIG. 2, by selecting a print button 305 in FIG. 3 shown on the workscreen 300. At block 220, the method 100 asks the user whether the design is complete, i.e. whether the user has a finished design that is ready for submission. If not, the method takes the user back to the design workscreen via entry point C, indicated at reference character 209. If yes, the user has the option to submit the design at block 221. As shown in FIG. 3, this is typically accomplished by a "submit" button on the design workscreen 306. If yes, the finished design is storably received on data storage means, as shown at block 222. It is notable that the finished design need not be storably received at the same data storage means (104 in FIG. 1) as where the graphics design software 103 is installed; alternatively, different data storage medium located may be used. Next, at block 223, the user will preferably also have the option of printing the submitted final design, which will then be printed at block 224. And finally, the method 100 determines whether the user would like to design another product stored in the database module. If yes, the user is taken back to block 204 via entry point B, indicated at reference character 205. If not, the graphic design software 103 will terminate and the user is taken back to the host web page at block 201 via entry point A 202.

After storably receiving a sufficient plurality of final designs, one preferred embodiment of the method 100 further provides a step of selecting at least one winner to receive a corresponding award incentive (not shown). The selection is preferably made based on pre-defined selection criteria, such as the degree of variance between the final design and a pre-determined design scheme. Alternatively, the pre-defined selection criteria may be based on a manufacturer/producer's decision to commercially construct and produce a final design submission. Providing an award incentive functions to draw more users to the remote host system 101, to create and submit user-created designs.

It is notable that while the remote host service provider is typically a producer of a product who wishes to directly inquire and compile design ideas and suggestions from the general public, this need not always be the case. A third party provider may also provide such graphic design software on a remote host system, whereby users are given a selection of products from which to choose and design. These third party providers may in turn, then sell the acquired design submissions to the corresponding manufacturer/producer for their consideration and evaluation.

In this manner, the method and system 100 of the present invention would allow the manufacturer of a product to get a wealth of design suggestions for their respective product. This will give the manufacturer an exorbitant amount of design ideas, many of which the manufacturing company would never have conceived of independently. It would also expose a manufacturer to the public's varying opinions and input of what the product should look like. Being informed of the going consumer trends/styles of the times, the manufacturer would be able to design the product so as to maximize its potential sale. Implementation of this invention may also help promote awareness of a particular product line.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A method of collectively generating for acquisition user-created designs of products via a communications network, said method comprising the steps of:

establishing graphic design software on a remote host system connected to said communications network, said graphic design software having a database module containing product data for at least one product, and a graphic tool module for visually affecting graphic images, said graphic design software configured to run multiple, concurrent, and independent program sessions on said remote host system;

providing public access to said graphic design software by remote interface means, wherein a plurality of users may each run independent program sessions of said graphic design software on said remote host system from respective client systems connected to said communications network;

running an independent program session of said graphic design software on said remote host system in response to each of said plurality of users, said step of running an independent program session including the steps of, under control of each of said plurality of users, each user selecting from said database module at least one target product to be designed, each user creating a final design of said at least one target product using said graphic tool module, and each user submitting the respective user's final design to said remote host system; and storably receiving each respective user's final design on data storage means of said remote host system.

2. The method recited by claim 1, further comprising the steps of:

upon storably receiving a plurality of respective user's final designs, selecting at least one winner using selection criteria; and providing said at least one winner a corresponding award.

3. The method recited by claim 1, wherein the step of each user creating a final design of said at least one target product comprises the step of providing an option to save an unfinished design of each such respective user.

4. A method of collectively generating for acquisition user-created designs of products via a communications network, said method comprising the steps of:

establishing graphic design software on a remote host system connected to said communications network, said graphic design software having a database module containing product data for at least one product, said product data including a plurality of parts images associated with said at least one product, and a graphic tool module for visually affecting graphic images, said graphic design software configured to run multiple, concurrent, and independent program sessions on said remote host system;

providing public access to said graphic design software by remote interface means, wherein a plurality of users may each run independent program sessions of said graphic design software on said remote host system from respective client systems connected to said communications network, running an independent program session of said graphic design software on said remote host system in response to each of said plurality of users, said step of running an independent program session including the steps of, under control of each of said plurality of users, selecting from said database module at least one target product to be designed, each user selecting from said database module at least one target parts image associated with said at least one target product, each user creating a final design of said at least one target product using said graphic tool module including visually affecting said at least one target parts image, and each user submitting the respective user's final design to said remote host system; and storably receiving each respective user's final design on data storage means of said remote host system.

5. The method recited by claim 4, further comprising the steps of:

upon storably receiving a plurality of respective user's final designs, selecting at least one winner using selection criteria; and providing said at least one winner a corresponding award.

6. The method recited by claim 4, wherein the step of each user creating a final design of said at least one target product comprises the step of providing an option to save an unfinished design of each such respective user.

7. A system for collectively generating for acquisition user-created designs of products via a communications network, said system comprising:

in a remote host system connected to the communications network, computer processor means for processing data;

data storage means for storing data;

graphic design software having a database module containing product data for at least one product, and a graphic tool module for visually affecting graphic images, said graphic design software configured to run multiple, concurrent, and independent program sessions on said remote host system; and remote interface means for providing public access to said graphic design software by a plurality of users via a respective plurality of client systems, wherein the plurality of users may each run an independent program session of said graphic design software on said remote host system from respective client systems connected to said communications network in response to each of said plurality of users, and wherein each of said plurality of users may select from said database module at least one target product to be designed, each of said plurality of users creates a final design of said at least one target product using said graphic tool module, and each of said plurality of users submits the respective user's final design to said remote host system where it may be storably received on said data storage means.

8. A system for collectively generating for acquisition user-created designs of products via a communications network, said system comprising:

in a remote host system connected to the communications network, computer processor means for processing data;

data storage means for storing data;

graphic design software having a database module containing product data for at least one product, said product data including a plurality of parts images associated with said at least one product, and a graphic tool module for affecting graphic images, said graphic design software configured to run multiple, concurrent, and independent program sessions on said remote host system; and remote interface means for providing public access to said graphic design software by a plurality of users via a respective plurality of client systems, wherein the plurality of users may each run an independent program session of said graphic design software on said remote host system from respective client systems connected to said communications network in response to each of said plurality of users, and wherein each of said plurality of users may select from said database module a target product to be designed, each of said plurality of users selects from said database module at least one parts image associated with said at lest one target product, each of said plurality of users creates a final design using said graphic tool module including visually affecting said at least one target parts image, and each of said plurality of users submits the respective user's final design to said remote host system where it may be storably received on said data storage means.

9. A method of generating product designs via a communications network, said method comprising the steps of:

providing graphic design software and product data for at least one product on a remote host system connected to said communications network, said graphic design software associated with said product data and having a graphic tool module for visually affecting graphic images;

providing public access to said graphic design software and said product data by remote user client systems connected to said communications network;

permitting a plurality of independent users to independently operate upon said product data with said graphic design software, each user selecting at least one target product to be designed, each user creating a final design of said at least one target product, and each user submitting the respective user's final design to the remote host system.

10. The method recited by claim 9 including the step of offering an award to the user who submits a selected final design.

11. The method recited by claim 9 wherein each user submits the respective user's final design to the remote host system over the communications network.

12. A system for generating product designs via a communications network, said system comprising:

in a remote host system connected to the communications network and hosted by a host provider,
  (i.) computer processor means for processing data;
  (ii.) data storage means for storing data;
  (iii.) graphic design software and product data for at least one product, said graphic design software associated with said product data and having a graphic tool module for visually affecting graphic images; and
  (iv.) remote interface means for providing public access to said graphic design software and said product data by remote user client systems connected to said communications network;

wherein each of said plurality of users may independently operate upon said product data with said graphic design software, each of said plurality of users selecting at least one target product to be designed, each of said plurality of users creating a final design of said at least one target product, and each of said plurality of users submitting the respective user's final design to said host provider.

13. The system recited by claim 12 wherein each user submits the respective user's final design to the host provider over the communications network.

14. A method of generating product designs, said method comprising the steps of:

providing product data for at least one target product on a remote host system connected to a communications network and hosted by a host provider, said product data being associated with a graphics design software;

providing public access to said product data by remote user client systems connected to said communications network;

permitting a plurality of independent users to independently operate upon said product data with said graphics design software, each user independently creating a final design of said at least one target product; and receiving the respective user's final design for said at least one target product from each of the plurality of users.

15. The method recited by claim 14 including the further step of offering an award to the user who submits a selected final design.

16. The method recited by claim 14 wherein each user submits the respective user's final design to the host provider over the communications network.

17. The method recited by claim 14 wherein said graphics design software is provided to each of the plurality of independent users via said communications network.

18. A system for generating product designs for a target product via a communications network, said system comprising:

a. a remote host system connected to the communications network and hosted by a host provider, said remote host system including:
  i. a computer processor for processing data;
  ii. a data storage which stores product data for at least one target product; and
  iii. a network interface for coupling said remote host system to the communications network and providing public access to said product data stored in said data storage via said communications network; and b. a plurality of remote user client systems connected to said communications network, each of said remote user client systems having access to said product data over the communications network, and each of said remote user client systems independently operating graphic design software upon said product data to create a final design for said at least one target product for submission to said host provider.

19. A method of generating product designs, said method comprising the steps of:

a. providing product data for at least one target product on a remote host system connected to a communications network and hosted by a host provider;

b. providing public access to said product data by remote user client systems connected to said communications network;

c. permitting a plurality of independent users to independently utilize said product data with a graphic design software, each user independently creating a final design of said at least one target product; and d. receiving the respective independent user's final design for said at least one target product from each of the plurality of users.

20. A method of generating a preferred design for a target project, said method comprising the steps of:
 a. providing product data for said target project on a remote host system connected to a communications network;
 b. providing public access to said product data by a plurality of remote users each operating remote user client systems connected to said communications network;
 c. permitting each of said plurality of remote user to independent utilize said product data with a graphic design software, each creating a final design of said at least one target project;
 d. receiving a plurality of independent user's final designs for said target project; and
 e. selecting a best design for the target project from among the plurality of received designs.

* * * * *